July 5, 1932.   E. T. REMY   1,865,961
VENTILATOR
Filed Feb. 19, 1930
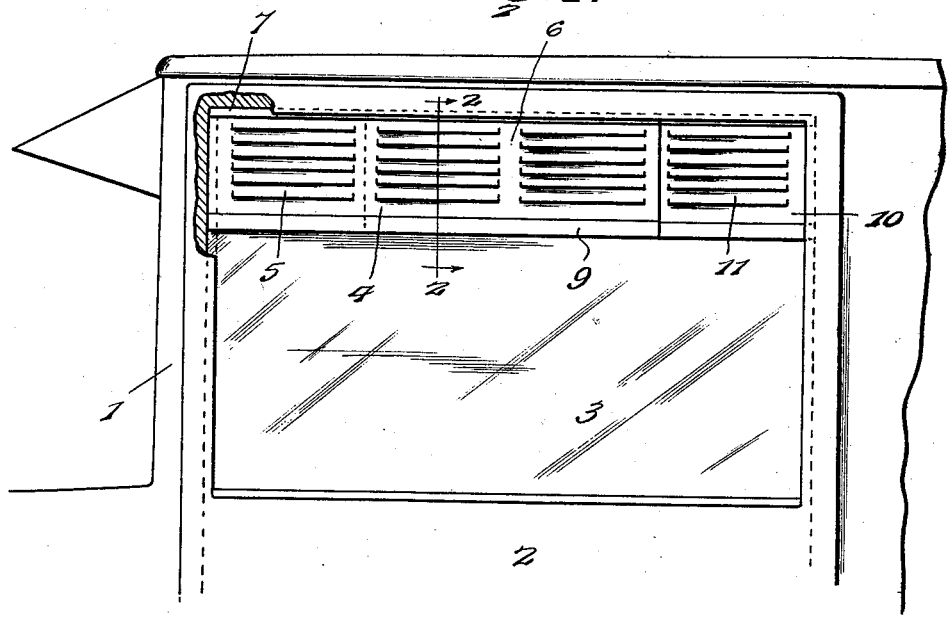
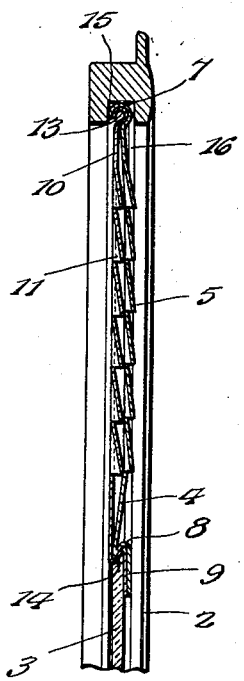
Inventor
E. T. Remy.
By Lacey & Lacey,
Attorneys Patented July 5, 1932

1,865,961

UNITED STATES PATENT OFFICE

EARL T. REMY, OF CRESTLINE, OHIO, ASSIGNOR TO VOISARD, INCORPORATED, OF SHILOH, OHIO, A CORPORATION OF OHIO

VENTILATOR

Application filed February 19, 1930. Serial No. 429,714.

This invention has for its object the provision of a ventilator of simple and inexpensive construction which is particularly adapted to be applied to the window or door of a motor vehicle so that needed ventilation will be provided while at the same time the weather elements will be excluded. It is an object of the invention to provide a ventilator which may be extended so as to fit closely within a window or door frame of various widths and which may snugly engage over the upper edge of the glass in the frame. Other objects will appear incidentally in the course of the following description, and the invention resides in certain novel features which will be particularly defined in the appended claim.

In the drawing:

Figure 1 is a side elevation, partly broken away, of a ventilator in position within the glazed opening of an automobile door, and Fig. 2 is an enlarged vertical section on the line 2—2 of Fig. 1.

In the drawing, the reference numeral 1 indicates a portion of a vehicle body and 2 indicates the door of the same, said door having an opening in its upper portion in which is mounted a pane of glass 3 which is adapted to move vertically in the frame in a well known manner. In carrying out the present invention, there are provided a pair of similar mating members which are slidably connected so as to overlap and be held together by the members of the slidable or extensible joints. The outer member 4 of the ventilator is a sheet metal plate having louvers 5 stamped therein in vertical series with the members of each series extending longitudinally of the plate. While the louvers may extend from end to end of the plate, they are preferably made of shorter lengths and intervening portions 6 of the plate left intact to reinforce the same and counteract any tendency to buckle in use. The upper edge of the plate is formed into a bead or roll 7 of arcuate cross section, as shown most clearly in Fig. 2, while the lower edge of the plate is crimped or bent to define a V-shaped fold 8 having one member extending slightly upwardly and outwardly from the body of the plate and having a depending portion 9 extending vertically from the outer edge of the upwardly and outwardly extending portion. The inner plate 10 of the ventilator also has louvers 11 struck therefrom, and these louvers are arranged in similar formation as the louvers 5. The upper edge of the inner plate 10 is also formed into an arcuate bead or roll 13 which is of slightly less diameter than the roll or bead 7 on the outer plate so that it may be engaged within said outer bead and move longitudinally of the same. Along the lower edge of the inner plate is formed a fold or crimp 14 which corresponds in shape to the fold 8 on the outer plate and is of such dimensions that it may fit slidably within the latter. The rolls or beads at the upper edges of the plates and the crimps or folds along the lower edges thereof fit snugly together so that lateral separation of the plates will be prevented but endwise relative movement of the same may be permitted and the plates will be held firmly in any position in which they may be set. The door and window frames of automobiles are formed with a groove 15 in their lintels and in their stiles or side portions are vertical grooves 16 which are generally lined with felt or some similar material which will cushion the glass pane 3 in its movements and tend to prevent breaking of the same under vibration caused by travel over rough roads. In applying the improved ventilator to a door or window opening, the glass pane is lowered so that the ventilator may be fitted between the top edge of the lintel of the frame and the top edge of the glass pane, the crimps or folds 8 and 14 being engaged over the upper edge of the glass, as clearly shown in Fig. 2, while the beads or rolls along the upper edge of the ventilator are fitted within the groove 15 in the door or window lintel. The glass is raised so that the ventilator will be held by and between the upper edge of the same and the lintel, and the ventilator is extended so that its end edges will fit within the grooves 16 and may be cushioned upon the material which lines the grooves.

From the foregoing description, taken in connection with the accompanying drawing, it will be seen that I have provided an exceedingly simple device which may be easily fitted within a door or window opening above the glass therein and held in the opening by its engagement with the door or window frame and the upper edge of the glass. The louvers closely overlie each other so that, while an open passage for the circulation of air will be provided, the entrance of dust and other foreign matter will be prevented. The louvers in the two plates are arranged in corresponding horizontal planes so that in all positions of the louvers there will be an open passage for the circulation of the air and the outer plate is preferably bowed slightly so that there will be no interference with the movement of the plates by reason of the louvers projecting from the inner plate. It is to be particularly noted that the depending flaps or branches of the crimps or folds 8 and 14 are relatively elongated so that they will pass below the upper edge of the glass and bear against the outer face of the same and thereby firmly support the ventilator on the glass and prevent dust or other elements working up over the glass behind the flaps. It will also be noted that the folds or bends of these interengaging portions are quite sharply defined so that they will resist any tendency of the plates to separate at their lower edges and they also reinforce the lower edges of the plates so that any tendency of the plates to buckle along said edges will be prevented. It will be further noted that the beads at the upper edges of the ventilating plates fill the groove in the lintel of the door or window frame so that the walls of the groove will be frictionally engaged to such a degree that the ventilator will be firmly held and if the plates be moved endwise to elongate the ventilator to its fullest extent the engagement between the ends of the ventilator and the side grooves in the door or window frame will be sufficient to hold the ventilator against dropping to a very pronounced degree. The entire ventilator is disposed within the lines or outside surfaces of the window or door frame and substantially within the vertical plane of the slidable glass pane. The crimps at the lower edges of the plates may be very easily made and are of such form that they effectually resist any tendency of the plates to separate at their lower edges and the downward elongations of these crimps serve as guides in inserting the ventilator in place as well as fitting closely against the outer side of the glass to resist the entrance of dust through the window or door opening. By disposing the ventilator substantially in the vertical plane of the glass pane, the ventilator will be supported with minimum strain upon the glass and any tendency which might otherwise exist toward chipping of the glass will be effectually overcome. The device may be produced at a very low cost and may be readily applied to any vehicle door or window.

Having thus described the invention, I claim:

A ventilator for use in an opening having grooves in its sides and in its top and containing a pane slidable in the grooves in the sides of the opening, said ventilator comprising two plates having louvers formed therein and having their upper edges rolled to form beads, one bead fitting closely within the other bead to permit relative endwise movement and prevent relative sidewise movement, the outer bead fitting snugly in the groove in the top of the opening, and each plate having its lower edge formed into a crimp extending upwardly and outwardly from the plate and then downwardly, the crimp on the inner plate fitting snugly within the crimp on the outer plate and engaging over the upper edge of the vertically movable pane with the downwardly extending portions of the crimps bearing against the outer face of the pane and the plates lying wholly within the opening and substantially in the plane of the pane, the thrust on the pane edge being perpendicular to the edge face of the pane whereby to minimize the strain on the pane which tends toward chipping of the glass.

In testimony whereof I affix my signature.

EARL T. REMY. [L. S.]